United States Patent [19]
Westerheid

[11] 3,929,166
[45] Dec. 30, 1975

[54] PIPELINE THERMAL INSULATION

[75] Inventor: Robert J. Westerheid, Seabrook, Tex.

[73] Assignee: General Electric Company, Fairfield, Conn.

[22] Filed: Aug. 9, 1973

[21] Appl. No.: 387,206

[52] U.S. Cl. ............. 138/149; 138/141; 138/157; 285/133; 285/DIG. 5
[51] Int. Cl.² ............. F16L 9/14; F16L 9/22
[58] Field of Search ......... 138/149, 164, 108, 156, 138/163, 114, 157, 158; 181/36 B; 285/133, DIG. 5

[56] References Cited
UNITED STATES PATENTS

| | | | |
|---|---|---|---|
| 2,330,966 | 10/1943 | Gottwald et al. | 138/149 |
| 2,718,273 | 9/1955 | Dehaus | 181/36 B |
| 2,841,203 | 7/1958 | Gronemeyer | 138/149 X |
| 3,284,860 | 11/1966 | Gurak | 138/149 X |
| 3,289,491 | 12/1966 | Conrad | 74/501 P X |
| 3,317,074 | 5/1967 | Barker, Jr. et al. | 138/149 X |
| 3,359,351 | 12/1967 | Bender | 138/149 X |
| 3,491,171 | 1/1970 | French | 138/149 X |
| 3,563,825 | 2/1971 | Segura et al. | 138/164 X |
| 3,628,572 | 12/1971 | Shannon | 138/149 X |
| 3,685,546 | 8/1972 | Sigmund | 138/149 |
| 3,728,187 | 4/1973 | Martin | 138/149 X |

Primary Examiner—Jerry W. Myracle
Assistant Examiner—Daniel M. Yasich
Attorney, Agent, or Firm—Raymond H. Quist; Allen E. Amgott

[57] ABSTRACT

Preformed foam insulation in longitudinal sections forming segments of an annulus are bonded to outer sheet metal covers. The segments are assembled about a pipeline which is to carry hot gas or oil in a cold climate such as the Arctic. To eliminate shear forces on the insulation because of differential thermal expansion and contraction of the pipe and the cover, the insulation has an inner diameter larger than the outer diameter of the pipe and friction reducing means is provided between the insulation and the pipe.

4 Claims, 5 Drawing Figures

PIPELINE THERMAL INSULATION

BACKGROUND OF THE INVENTION

This invention relates to thermal insulation for a pipeline.

Arctic oil and gas pipelines are required to be insulated not only to protect the environment from the effects of localized heating over a long period of time, but also (in the case of oil) to prevent the oil from becoming too viscous. The latter problem, or its analogy, can also exist in temperate or even tropical regions where the oil or other product is too viscous to flow readily at ambient temperatures.

The requirements for insulation in the Arctic are quite severe since the insulation must be installed in a hostile (to man and material) environment, and will be exposed to extreme cold on the outside while covering a pipe containing hot oil or gas. Also, the insulation must be protected from degradation by the sun and weather, as well as, damage by animals.

SUMMARY OF THE INVENTION

In a preferred form of the invention, longitudinal sections or modules of insulation forming segments of an annulus are bonded to outer sheet metal covers. The modules also include a friction reducing surface such as a polyethylene sheet on the inner surface of the insulation. Friction between the insulation and the pipe which it surrounds is also reduced by making the inside diameter of the insulation annulus larger than the outside diameter of the pipe. Means for securing the insulation to the pipe at spaced intervals is disclosed, as well as, a joint between insulation sections which minimizes the effects on the insulation capabilities because of contraction due to cold.

DESCRIPTION OF THE PREFERRED EMBODIMENT

Figure 1:
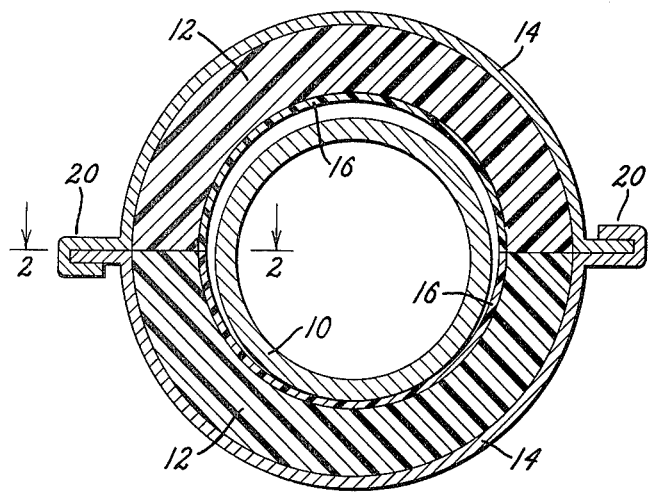
FIG. 1 is a cross-section of a pipe covered with the insulation of this invention.

Referring to FIG. 1, in accordance with the invention, oil or gas carrying pipe 10 is covered with modules of segmented thermal insulation 12 which form an annulus about the pipe. In this case, upper and lower segment modules are employed although a larger number of segments may be used, particularly with large diameter pipes. Insulation 12 is a polyurethane foam which has been blown in, and is integral with, protective metal cover 14, although the insulation may also be separately formed and then bonded to the metal. Cover 14 has been fabricated from 26 gauge galvanized steel, although a thicker or thinner gauge may also be used. As shown, the upper and lower halves may be joined along a longitudinal seam or flange 20 by clinching or the like.

As previously indicated, pipe 10 will be carrying hot oil or gas, while at the same time metal cover 14 may be exposed to sub-zero temperatures. If insulation 12 were secured to both pipe 10 and cover 14 along the length, the respective expansion and contraction would produce destructive shear forces in the foam.

To avoid shear forces in the foam, a friction reducing means is provided between the foam and the pipe. In FIG. 1, sheet 16 which is a 3 mil polyethlene material is secured to insulation 12 to reduce friction. The friction reducing means can also be applied to pipe 10, and in factory installation of insulation it might be preferable to do so.

Shear forces in insulation 12 are also avoided by providing a clearance between pipe 10 and insulation 12, as illustrated.

The insulation segments have been fabricated in lengths of approximately nineteen feet, however, the length is largely a matter of choice and convenience for shipping and installation.

Figure 2:
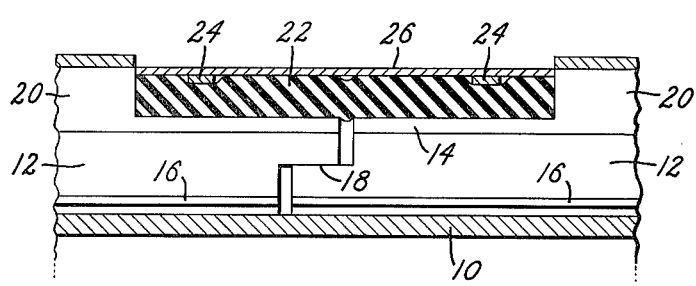
FIG. 2 is a partial cross-section detailing the joint between adjacent insulation modules.

To accommodate shrinkage which develops because of the cold temperatures, each joint between insulation sections is fabricated as shown in FIG. 2. The wall of pipe 10 is not shown as having a joint at this point since the insulation modules are not designed to be conterminous with pipe lengths (also the pipe may be welded). Insulation 12 is provided with lap joint 18 to minimize heat leakage as the modules separate. Over metal cover 14, and extending between flanges 20 is butyl rubber sheet 22 secured by metal bands 24. Metal cover 26 completes the joint.

Figure 4:
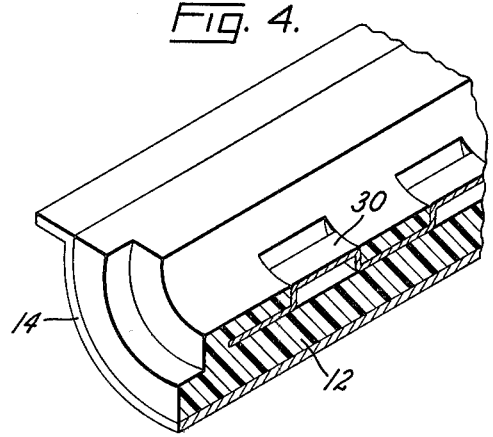
FIG. 4 is an somesric showing the securing arrangement of FIG. 3 embedded in the insulation.
Figure 3:
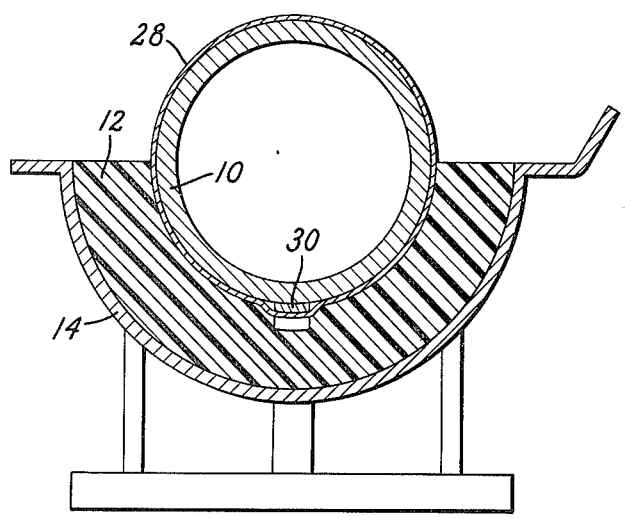
FIG. 3 is a cross-section showing the insulation secured to the pipe.
Figure 5:
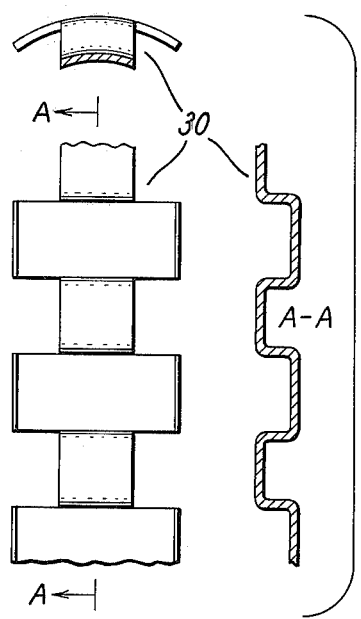
FIG. 5 includes three views of the structure which is embedded as in FIG. 4.

Although over most of the length of the pipe it is desirable to have low friction between the insulation and the pipe, it may be desired to have a positive connection at spaced intervals (such as at the pipe supports or between insulation segments). In FIG. 3, pipe 10 is secured to the lower segment of insulation 12 by band 28 which passes through cleat 30. Cleat 30 is one of several which are molded into insulation 12 near the end of the segment as shown in FIG. 4. The structure of cleat 30 is more clearly shown in the three views of FIG. 5. Cleat 30 can also be molded into short segments of insulation (pups) and secured to the pipe. This positive connection would be used when the pipe has the insulation pre-installed.

While a particular embodiment of pipeline thermal insulation has been illustrated and described, it will be obvious that changes and modifications can be made without departing from the spirit of the invention and the scope of the appended claims.

I claim:

1. Improved insulation for application to a pipe carrying hot fluids in an environment which is cool relative to the fluids comprising:
    preformed foamed insulation in a longitudinal section forming a segment of an annulus;
    said annulus having an inner diameter sufficiently larger than the outer diameter of the pipe to permit free relative axial movement between the pipe and the insulation;
    a segmented sheet metal cover to which said insulation is bonded; and
    friction reducing means between the inner surface of said segment and the outer surface of said pipe to eliminate shear forces in the foamed insulation when the relative movement occurs, whereby friction between said pipe and said segment is reduced.

2. The insulation of claim 1 further including:
    securing means molded in said insulation for securing said insulation to said pipe at spaced intervals.

3. The insulation of claim 1 wherein:
said friction reducing means is a polyethylene sheet.
4. The insulation of claim 3 wherein:
said sheet is bonded to the inner surface of said insulation section.

* * * * *